(12) United States Patent
Veloso et al.

(10) Patent No.: US 11,943,391 B1
(45) Date of Patent: Mar. 26, 2024

(54) METHOD AND APPARATUS FOR ROUTING COMMUNICATIONS WITHIN A CONTACT CENTER

(71) Applicant: Talkdesk, Inc., San Francisco, CA (US)

(72) Inventors: António Pedro Dourado de Moura Veloso, Lisbon (PT); Ana Carina Fernandes Rodrigues, Odivelas (PT); Pedro Miguel Reis Santos, Corroios (PT); Yue Sun, Wuhan (CN)

(73) Assignee: Talkdesk, Inc., San Francisco, CA (US)

( * ) Notice: Subject to any disclaimer, the term of this patent is extended or adjusted under 35 U.S.C. 154(b) by 0 days.

(21) Appl. No.: 18/065,312

(22) Filed: Dec. 13, 2022

(51) Int. Cl.
*H04M 3/523* (2006.01)
*H04M 3/51* (2006.01)

(52) U.S. Cl.
CPC .............................. *H04M 3/5233* (2013.01)

(58) Field of Classification Search
None
See application file for complete search history.

(56) References Cited

U.S. PATENT DOCUMENTS

| | | | |
|---|---|---|---|
| 5,862,203 A | 1/1999 | Wulkan et al. |
| 5,897,616 A | 4/1999 | Kanevsky et al. |
| 5,966,691 A | 10/1999 | Kibre et al. |
| 5,970,124 A | 10/1999 | Csaszar et al. |
| 6,100,891 A | 8/2000 | Thorne |
| 6,128,415 A | 10/2000 | Hultgren et al. |
| 6,163,607 A | 12/2000 | Bogart et al. |
| 6,230,197 B1 | 5/2001 | Beck et al. |
| 6,263,057 B1 | 7/2001 | Silverman |
| 6,345,093 B1 | 2/2002 | Lee et al. |
| 6,385,584 B1 | 5/2002 | McAlister et al. |
| 6,411,687 B1 | 6/2002 | Bohacek et al. |
| 6,493,695 B1 | 12/2002 | Pickering et al. |
| 6,560,222 B1 | 5/2003 | Pounds et al. |
| 6,587,831 B1 | 7/2003 | O'Brien |
| 6,639,982 B1 | 10/2003 | Stuart et al. |

(Continued)

FOREIGN PATENT DOCUMENTS

| | | |
|---|---|---|
| EP | 1 418 519 A1 | 5/2004 |
| JP | 5986065 B2 | 9/2016 |

(Continued)

OTHER PUBLICATIONS

Gaietto, Molly., "What is Customer DNA?",—NGDATA Product News, Oct. 27, 2015, 10 pages.

(Continued)

*Primary Examiner* — Harry S Hong
(74) *Attorney, Agent, or Firm* — Rimon PC; Marc S. Kaufman

(57) ABSTRACT

Communications within a call center are routed to agents based on available capacity of the agents. Weighting values are associated with communications and each agent has a maximum capacity. Calls are routed to agents based on a current occupancy of each agent. The current occupancy is determined based on weighting values associated with communications currently being handled by the agents. Agents generally are not assigned a communication that would result in an occupancy that is greater than the agent's maximum capacity.

22 Claims, 5 Drawing Sheets

(56) References Cited

U.S. PATENT DOCUMENTS

| | | |
|---|---|---|
| 6,721,416 B1 | 4/2004 | Farrell |
| 6,754,333 B1 | 6/2004 | Flockhart et al. |
| 6,859,776 B1 | 2/2005 | Cohen et al. |
| 6,970,829 B1 | 11/2005 | Leamon |
| 7,023,979 B1 | 4/2006 | Wu et al. |
| 7,076,047 B1 | 7/2006 | Brennan et al. |
| 7,110,525 B1 | 9/2006 | Heller et al. |
| 7,209,475 B1 | 4/2007 | Shaffer et al. |
| 7,274,787 B1 | 9/2007 | Schoeneberger |
| 7,292,689 B2 | 11/2007 | Odinak et al. |
| 7,343,406 B1 | 3/2008 | Buonanno et al. |
| 7,372,952 B1 | 5/2008 | Wu et al. |
| 7,382,773 B2 | 6/2008 | Schoeneberger et al. |
| 7,409,336 B2 | 8/2008 | Pak et al. |
| 7,426,268 B2 | 9/2008 | Walker et al. |
| 7,466,334 B1 | 12/2008 | Baba |
| 7,537,154 B2 | 5/2009 | Ramachandran |
| 7,634,422 B1 | 12/2009 | Andre et al. |
| 7,657,263 B1 | 2/2010 | Chahrouri |
| 7,672,746 B1 | 3/2010 | Hamilton et al. |
| 7,672,845 B2 | 3/2010 | Beranek et al. |
| 7,676,034 B1 | 3/2010 | Wu et al. |
| 7,698,163 B2 | 4/2010 | Reed et al. |
| 7,752,159 B2 | 7/2010 | Nelken et al. |
| 7,774,790 B1 | 8/2010 | Jirman et al. |
| 7,788,286 B2 | 8/2010 | Nourbakhsh et al. |
| 7,853,006 B1 | 12/2010 | Fama et al. |
| 7,864,946 B1 | 1/2011 | Fama et al. |
| 7,869,998 B1 | 1/2011 | Di Fabbrizio et al. |
| 7,949,123 B1 | 5/2011 | Flockhart et al. |
| 7,953,219 B2 | 5/2011 | Freedman et al. |
| 7,966,369 B1 | 6/2011 | Briere et al. |
| 8,060,394 B2 | 11/2011 | Woodings et al. |
| 8,073,129 B1 | 12/2011 | Kalavar |
| 8,116,446 B1 | 2/2012 | Kalavar |
| 8,135,125 B2 | 3/2012 | Sidhu et al. |
| 8,160,233 B2 | 4/2012 | Keren et al. |
| 8,184,782 B1 | 5/2012 | Vatland et al. |
| 8,223,951 B1 | 7/2012 | Edelhaus et al. |
| 8,229,761 B2 | 7/2012 | Backhaus et al. |
| 8,243,896 B1 | 8/2012 | Rae |
| 8,300,798 B1 | 10/2012 | Wu et al. |
| 8,369,338 B1 | 2/2013 | Peng et al. |
| 8,370,155 B2 | 2/2013 | Byrd et al. |
| 8,391,466 B2 | 3/2013 | Noble, Jr. |
| 8,447,279 B1 | 5/2013 | Peng et al. |
| 8,488,769 B1 | 7/2013 | Noble et al. |
| 8,526,576 B1 | 9/2013 | Deich et al. |
| 8,535,059 B1 | 9/2013 | Noble, Jr. et al. |
| 8,583,466 B2 | 11/2013 | Margulies et al. |
| 8,594,306 B2 | 11/2013 | Laredo et al. |
| 8,626,137 B1 | 1/2014 | Devitt et al. |
| 8,635,226 B2 | 1/2014 | Chang et al. |
| 8,644,489 B1 | 2/2014 | Noble et al. |
| 8,671,020 B1 | 3/2014 | Morrison et al. |
| 8,688,557 B2 | 4/2014 | Rose et al. |
| 8,738,739 B2 | 5/2014 | Makar et al. |
| 8,767,948 B1 | 7/2014 | Riahi et al. |
| 8,811,597 B1 | 8/2014 | Hackbarth et al. |
| 8,861,691 B1 | 10/2014 | De et al. |
| 8,869,245 B2 | 10/2014 | Ranganathan et al. |
| 8,898,219 B2 | 11/2014 | Ricci |
| 8,898,290 B2 | 11/2014 | Siemsgluess |
| 8,909,693 B2 | 12/2014 | Frissora et al. |
| 8,935,172 B1 | 1/2015 | Noble, Jr. et al. |
| 8,996,509 B1 | 3/2015 | Sundaram |
| 9,020,142 B2 | 4/2015 | Kosiba et al. |
| 9,026,431 B1 | 5/2015 | Moreno Mengibar et al. |
| 9,060,057 B1 | 6/2015 | Danis |
| 9,065,915 B1 | 6/2015 | Lillard et al. |
| 9,082,094 B1 | 7/2015 | Etter et al. |
| 9,100,483 B1 | 8/2015 | Snedden |
| 9,117,450 B2 | 8/2015 | Cook et al. |
| 9,123,009 B1 | 9/2015 | Etter et al. |
| 9,137,366 B2 | 9/2015 | Medina et al. |
| 9,152,737 B1 | 10/2015 | Micali et al. |
| 9,160,853 B1 | 10/2015 | Daddi et al. |
| 9,178,999 B1 | 11/2015 | Hegde et al. |
| 9,185,222 B1 | 11/2015 | Govindarajan et al. |
| 9,237,232 B1 | 1/2016 | Williams et al. |
| 9,280,754 B1 | 3/2016 | Schwartz et al. |
| 9,286,413 B1 | 3/2016 | Coates et al. |
| 9,300,801 B1 | 3/2016 | Warford et al. |
| 9,319,524 B1 | 4/2016 | Webster |
| 9,386,152 B2 | 7/2016 | Riahi et al. |
| 9,397,985 B1 | 7/2016 | Seger et al. |
| 9,426,291 B1 | 8/2016 | Ouimette et al. |
| 9,473,637 B1 | 10/2016 | Venkatapathy et al. |
| 9,514,463 B2 | 12/2016 | Grigg et al. |
| 9,595,049 B2 | 3/2017 | Showers et al. |
| 9,609,131 B2 | 3/2017 | Placiakis et al. |
| 9,674,361 B2 | 6/2017 | Ristock et al. |
| 9,679,265 B1 | 6/2017 | Schwartz et al. |
| 9,774,731 B1 | 9/2017 | Haltom et al. |
| 9,787,840 B1 | 10/2017 | Neuer, III et al. |
| 9,813,495 B1 | 11/2017 | Van et al. |
| 9,823,949 B2 | 11/2017 | Ristock et al. |
| 9,883,037 B1 | 1/2018 | Lewis et al. |
| 9,894,478 B1 | 2/2018 | Deluca et al. |
| 9,930,181 B1 | 3/2018 | Moran et al. |
| 9,955,021 B1 | 4/2018 | Liu et al. |
| RE46,852 E | 5/2018 | Petrovykh |
| 9,998,596 B1 | 6/2018 | Dunmire et al. |
| 10,009,465 B1 | 6/2018 | Fang et al. |
| 10,038,788 B1 | 7/2018 | Khalatian |
| 10,044,862 B1 | 8/2018 | Cai et al. |
| 10,079,939 B1 | 9/2018 | Bostick et al. |
| 10,085,073 B2 | 9/2018 | Ray et al. |
| 10,101,974 B2 | 10/2018 | Ristock et al. |
| 10,115,065 B1 | 10/2018 | Fama et al. |
| 10,135,973 B2 | 11/2018 | Algard et al. |
| 10,154,138 B2 | 12/2018 | Te Booij et al. |
| 10,194,027 B1 | 1/2019 | Daddi et al. |
| 10,235,999 B1 | 3/2019 | Naughton et al. |
| 10,241,752 B2 | 3/2019 | Lemay et al. |
| 10,242,019 B1 | 3/2019 | Shan et al. |
| 10,276,170 B2 | 4/2019 | Gruber et al. |
| 10,277,745 B1 | 4/2019 | Araujo et al. |
| 10,290,017 B2 | 5/2019 | Traasdahl et al. |
| 10,331,402 B1 | 6/2019 | Spector et al. |
| 10,380,246 B2 | 8/2019 | Clark et al. |
| 10,440,180 B1 | 10/2019 | Jayapalan et al. |
| 10,445,742 B2 | 10/2019 | Prendki et al. |
| 10,460,728 B2 | 10/2019 | Anbazhagan et al. |
| 10,497,361 B1 | 12/2019 | Rule et al. |
| 10,554,590 B2 | 2/2020 | Cabrera-Cordon et al. |
| 10,554,817 B1 | 2/2020 | Sullivan et al. |
| 10,572,879 B1 | 2/2020 | Hunter et al. |
| 10,574,822 B1 | 2/2020 | Sheshaiahgari et al. |
| 10,601,992 B2 | 3/2020 | Dwyer et al. |
| 10,623,572 B1 | 4/2020 | Copeland |
| 10,635,973 B1 | 4/2020 | Dirac et al. |
| 10,636,425 B2 | 4/2020 | Naughton et al. |
| 10,699,303 B2 | 6/2020 | Ismail et al. |
| 10,715,648 B1 | 7/2020 | Vashisht et al. |
| 10,718,031 B1 | 7/2020 | Wu et al. |
| 10,728,384 B1 | 7/2020 | Channakeshava et al. |
| 10,735,586 B1 | 8/2020 | Johnston |
| 10,742,806 B2 | 8/2020 | Kotak |
| 10,750,019 B1 | 8/2020 | Petrovykh et al. |
| 10,783,568 B1 | 9/2020 | Chandra et al. |
| 10,789,956 B1 | 9/2020 | Dube |
| 10,803,865 B2 | 10/2020 | Naughton et al. |
| 10,812,654 B2 | 10/2020 | Wozniak |
| 10,812,655 B1 | 10/2020 | Adibi et al. |
| 10,827,069 B1 | 11/2020 | Paiva |
| 10,827,071 B1 | 11/2020 | Adibi et al. |
| 10,839,432 B1 | 11/2020 | Konig et al. |
| 10,841,425 B1 | 11/2020 | Langley et al. |
| 10,855,844 B1 | 12/2020 | Smith et al. |
| 10,861,031 B2 | 12/2020 | Sullivan et al. |
| 10,878,479 B2 | 12/2020 | Wu et al. |
| 10,943,589 B2 | 3/2021 | Naughton et al. |
| 10,970,682 B1 | 4/2021 | Aykin |

(56) References Cited

U.S. PATENT DOCUMENTS

| | | |
|---|---|---|
| 11,017,176 B2 | 5/2021 | Ayers et al. |
| 11,089,158 B1 | 8/2021 | Holland et al. |
| 2001/0008999 A1 | 7/2001 | Bull |
| 2001/0024497 A1 | 9/2001 | Campbell |
| 2001/0054072 A1 | 12/2001 | Discolo et al. |
| 2002/0019737 A1 | 2/2002 | Stuart et al. |
| 2002/0029272 A1 | 3/2002 | Weller |
| 2002/0034304 A1 | 3/2002 | Yang |
| 2002/0038420 A1 | 3/2002 | Collins et al. |
| 2002/0067823 A1 | 6/2002 | Walker et al. |
| 2002/0143599 A1 | 10/2002 | Nourbakhsh et al. |
| 2002/0169664 A1 | 11/2002 | Walker et al. |
| 2002/0174182 A1 | 11/2002 | Wilkinson et al. |
| 2002/0181689 A1 | 12/2002 | Rupe et al. |
| 2003/0007621 A1 | 1/2003 | Graves et al. |
| 2003/0009520 A1 | 1/2003 | Nourbakhsh et al. |
| 2003/0032409 A1 | 2/2003 | Hutcheson et al. |
| 2003/0061068 A1 | 3/2003 | Curtis |
| 2003/0112927 A1 | 6/2003 | Brown et al. |
| 2003/0126136 A1 | 7/2003 | Omoigui |
| 2003/0167167 A1 | 9/2003 | Gong |
| 2004/0044585 A1 | 3/2004 | Franco |
| 2004/0044664 A1 | 3/2004 | Cash et al. |
| 2004/0062364 A1 | 4/2004 | Dezonno et al. |
| 2004/0078257 A1 | 4/2004 | Schweitzer et al. |
| 2004/0098274 A1 | 5/2004 | Dezonno et al. |
| 2004/0103051 A1 | 5/2004 | Reed et al. |
| 2004/0141508 A1 | 7/2004 | Schoeneberger et al. |
| 2004/0162724 A1 | 8/2004 | Hill et al. |
| 2004/0162753 A1 | 8/2004 | Vogel et al. |
| 2004/0174980 A1 | 9/2004 | Knott et al. |
| 2004/0215451 A1 | 10/2004 | MacLeod |
| 2005/0033957 A1 | 2/2005 | Enokida |
| 2005/0043986 A1 | 2/2005 | Mcconnell et al. |
| 2005/0063365 A1 | 3/2005 | Mathew et al. |
| 2005/0071178 A1 | 3/2005 | Beckstrom et al. |
| 2005/0105712 A1 | 5/2005 | Williams et al. |
| 2005/0177368 A1 | 8/2005 | Odinak et al. |
| 2005/0226220 A1 | 10/2005 | Kilkki et al. |
| 2005/0228774 A1 | 10/2005 | Ronnewinkel |
| 2005/0246511 A1 | 11/2005 | Willman et al. |
| 2005/0271198 A1 | 12/2005 | Chin et al. |
| 2006/0095575 A1 | 5/2006 | Sureka et al. |
| 2006/0126818 A1 | 6/2006 | Berger et al. |
| 2006/0153357 A1 | 7/2006 | Acharya et al. |
| 2006/0166669 A1 | 7/2006 | Claussen |
| 2006/0188086 A1 | 8/2006 | Busey et al. |
| 2006/0209797 A1 | 9/2006 | Anisimov et al. |
| 2006/0215831 A1 | 9/2006 | Knott et al. |
| 2006/0229931 A1 | 10/2006 | Fligler et al. |
| 2006/0256953 A1 | 11/2006 | Pulaski et al. |
| 2006/0271361 A1 | 11/2006 | Vora et al. |
| 2006/0274856 A1 | 12/2006 | Dun et al. |
| 2006/0277108 A1 | 12/2006 | Altberg et al. |
| 2007/0016565 A1 | 1/2007 | Evans et al. |
| 2007/0036334 A1 | 2/2007 | Culbertson et al. |
| 2007/0038499 A1 | 2/2007 | Margulies et al. |
| 2007/0041519 A1 | 2/2007 | Erhart et al. |
| 2007/0061183 A1 | 3/2007 | Seetharaman et al. |
| 2007/0078725 A1 | 4/2007 | Koszewski et al. |
| 2007/0121902 A1 | 5/2007 | Stoica et al. |
| 2007/0121903 A1 | 5/2007 | Moore, Jr. et al. |
| 2007/0136284 A1 | 6/2007 | Cobb et al. |
| 2007/0155411 A1 | 7/2007 | Morrison |
| 2007/0157021 A1 | 7/2007 | Whitfield |
| 2007/0160188 A1 | 7/2007 | Sharpe et al. |
| 2007/0162296 A1 | 7/2007 | Altberg et al. |
| 2007/0198329 A1 | 8/2007 | Lyerly et al. |
| 2007/0201636 A1 | 8/2007 | Gilbert et al. |
| 2007/0263810 A1 | 11/2007 | Sterns |
| 2007/0265990 A1 | 11/2007 | Sidhu et al. |
| 2007/0269031 A1 | 11/2007 | Honig et al. |
| 2007/0280460 A1 | 12/2007 | Harris et al. |
| 2007/0287430 A1 | 12/2007 | Hosain et al. |
| 2008/0002823 A1 | 1/2008 | Fama et al. |
| 2008/0043976 A1 | 2/2008 | Maximo et al. |
| 2008/0065902 A1 | 3/2008 | Spohrer et al. |
| 2008/0095355 A1 | 4/2008 | Mahalaha et al. |
| 2008/0126957 A1 | 5/2008 | Tysowski et al. |
| 2008/0205620 A1 | 8/2008 | Odinak et al. |
| 2008/0225872 A1 | 9/2008 | Collins et al. |
| 2008/0254774 A1 | 10/2008 | Lee |
| 2008/0255944 A1 | 10/2008 | Shah et al. |
| 2008/0260138 A1 | 10/2008 | Chen et al. |
| 2008/0288770 A1 | 11/2008 | Kline et al. |
| 2008/0300955 A1 | 12/2008 | Hamilton et al. |
| 2009/0018996 A1 | 1/2009 | Hunt et al. |
| 2009/0080411 A1 | 3/2009 | Lyman |
| 2009/0086945 A1 | 4/2009 | Buchanan et al. |
| 2009/0086949 A1 | 4/2009 | Caspi et al. |
| 2009/0086953 A1 | 4/2009 | Vendrow |
| 2009/0110182 A1 | 4/2009 | Knight, Jr. et al. |
| 2009/0171164 A1 | 7/2009 | Jung et al. |
| 2009/0222551 A1 | 9/2009 | Neely et al. |
| 2009/0228264 A1 | 9/2009 | Williams et al. |
| 2009/0234710 A1 | 9/2009 | Belgaied et al. |
| 2009/0234732 A1 | 9/2009 | Zorman et al. |
| 2009/0245479 A1 | 10/2009 | Surendran |
| 2009/0285384 A1 | 11/2009 | Pollock et al. |
| 2009/0306981 A1 | 12/2009 | Cromack et al. |
| 2009/0307052 A1 | 12/2009 | Mankani et al. |
| 2010/0106568 A1 | 4/2010 | Grimes |
| 2010/0114646 A1 | 5/2010 | Mcilwain et al. |
| 2010/0189250 A1 | 7/2010 | Williams et al. |
| 2010/0211515 A1 | 8/2010 | Woodings et al. |
| 2010/0235341 A1 | 9/2010 | Bennett |
| 2010/0250196 A1 | 9/2010 | Lawler et al. |
| 2010/0262549 A1 | 10/2010 | Kannan et al. |
| 2010/0266115 A1 | 10/2010 | Fedorov et al. |
| 2010/0266116 A1 | 10/2010 | Stolyar et al. |
| 2010/0274618 A1 | 10/2010 | Byrd et al. |
| 2010/0287131 A1 | 11/2010 | Church |
| 2010/0293033 A1 | 11/2010 | Hall et al. |
| 2010/0299268 A1 | 11/2010 | Guha et al. |
| 2010/0332287 A1 | 12/2010 | Gates et al. |
| 2011/0014932 A1 | 1/2011 | Estevez |
| 2011/0022461 A1 | 1/2011 | Simeonov |
| 2011/0071870 A1 | 3/2011 | Gong |
| 2011/0077994 A1 | 3/2011 | Segev et al. |
| 2011/0082688 A1 | 4/2011 | Kim et al. |
| 2011/0116618 A1 | 5/2011 | Zyarko et al. |
| 2011/0125697 A1 | 5/2011 | Erhart et al. |
| 2011/0143323 A1 | 6/2011 | Cohen |
| 2011/0182283 A1 | 7/2011 | Van et al. |
| 2011/0185293 A1 | 7/2011 | Barnett et al. |
| 2011/0216897 A1 | 9/2011 | Laredo et al. |
| 2011/0264581 A1 | 10/2011 | Clyne |
| 2011/0267985 A1 | 11/2011 | Wilkinson et al. |
| 2011/0286592 A1 | 11/2011 | Nimmagadda |
| 2011/0288897 A1 | 11/2011 | Erhart et al. |
| 2012/0046996 A1 | 2/2012 | Shah et al. |
| 2012/0051537 A1 | 3/2012 | Chishti et al. |
| 2012/0084217 A1 | 4/2012 | Kohler et al. |
| 2012/0087486 A1 | 4/2012 | Guerrero et al. |
| 2012/0095835 A1 | 4/2012 | Makar et al. |
| 2012/0109830 A1 | 5/2012 | Vogel |
| 2012/0257116 A1 | 10/2012 | Hendrickson et al. |
| 2012/0265587 A1 | 10/2012 | Kinkead |
| 2012/0290373 A1 | 11/2012 | Ferzacca et al. |
| 2012/0321073 A1 | 12/2012 | Flockhart et al. |
| 2013/0023235 A1 | 1/2013 | Fan et al. |
| 2013/0073361 A1 | 3/2013 | Silver |
| 2013/0085785 A1 | 4/2013 | Rogers et al. |
| 2013/0090963 A1 | 4/2013 | Sharma et al. |
| 2013/0124361 A1 | 5/2013 | Bryson |
| 2013/0136252 A1 | 5/2013 | Kosiba et al. |
| 2013/0223608 A1 | 8/2013 | Flockhart et al. |
| 2013/0223610 A1 | 8/2013 | Kohler et al. |
| 2013/0236002 A1 | 9/2013 | Jennings et al. |
| 2013/0257877 A1 | 10/2013 | Davis |
| 2013/0304581 A1 | 11/2013 | Soroca et al. |
| 2013/0325972 A1 | 12/2013 | Boston et al. |
| 2014/0012603 A1 | 1/2014 | Scanlon et al. |
| 2014/0016762 A1 | 1/2014 | Mitchell et al. |

(56) References Cited

U.S. PATENT DOCUMENTS

| | | |
|---|---|---|
| 2014/0039944 A1 | 2/2014 | Humbert et al. |
| 2014/0039962 A1 | 2/2014 | Nudd et al. |
| 2014/0067375 A1 | 3/2014 | Wooters |
| 2014/0079195 A1 | 3/2014 | Srivastava et al. |
| 2014/0079207 A1 | 3/2014 | Zhakov et al. |
| 2014/0099916 A1 | 4/2014 | Mallikarjunan et al. |
| 2014/0101261 A1 | 4/2014 | Wu et al. |
| 2014/0136346 A1 | 5/2014 | Teso |
| 2014/0140494 A1 | 5/2014 | Zhakov |
| 2014/0143018 A1 | 5/2014 | Nies et al. |
| 2014/0143249 A1 | 5/2014 | Cazzanti et al. |
| 2014/0161241 A1 | 6/2014 | Baranovsky et al. |
| 2014/0164502 A1 | 6/2014 | Khodorenko et al. |
| 2014/0177819 A1 | 6/2014 | Vymenets et al. |
| 2014/0188477 A1 | 7/2014 | Zhang |
| 2014/0200988 A1 | 7/2014 | Kassko et al. |
| 2014/0219132 A1 | 8/2014 | Delveaux et al. |
| 2014/0219438 A1 | 8/2014 | Brown et al. |
| 2014/0233719 A1 | 8/2014 | Vyemenets et al. |
| 2014/0244712 A1 | 8/2014 | Walters et al. |
| 2014/0254790 A1 | 9/2014 | Shaffer et al. |
| 2014/0257908 A1 | 9/2014 | Steiner et al. |
| 2014/0270108 A1 | 9/2014 | Riahi et al. |
| 2014/0270138 A1 | 9/2014 | Uba et al. |
| 2014/0270142 A1 | 9/2014 | Bischoff et al. |
| 2014/0270145 A1 | 9/2014 | Erhart et al. |
| 2014/0278605 A1 | 9/2014 | Borucki et al. |
| 2014/0278649 A1 | 9/2014 | Guerinik et al. |
| 2014/0279045 A1 | 9/2014 | Shottan et al. |
| 2014/0279050 A1 | 9/2014 | Makar et al. |
| 2014/0314225 A1 | 10/2014 | Riahi et al. |
| 2014/0335480 A1 | 11/2014 | Asenjo et al. |
| 2014/0372171 A1 | 12/2014 | Martin et al. |
| 2014/0379424 A1 | 12/2014 | Shroff |
| 2015/0006400 A1 | 1/2015 | Eng et al. |
| 2015/0010134 A1 | 1/2015 | Erel et al. |
| 2015/0012278 A1 | 1/2015 | Metcalf |
| 2015/0016600 A1 | 1/2015 | Desai et al. |
| 2015/0023484 A1 | 1/2015 | Ni et al. |
| 2015/0030151 A1 | 1/2015 | Bellini et al. |
| 2015/0030152 A1 | 1/2015 | Waxman et al. |
| 2015/0051957 A1 | 2/2015 | Griebeler et al. |
| 2015/0066632 A1 | 3/2015 | Gonzalez et al. |
| 2015/0071418 A1 | 3/2015 | Shaffer et al. |
| 2015/0078538 A1 | 3/2015 | Jain |
| 2015/0100473 A1 | 4/2015 | Manoharan et al. |
| 2015/0127400 A1 | 5/2015 | Chan et al. |
| 2015/0127441 A1 | 5/2015 | Feldman |
| 2015/0127677 A1 | 5/2015 | Wang et al. |
| 2015/0142704 A1 | 5/2015 | London |
| 2015/0172463 A1 | 6/2015 | Quast et al. |
| 2015/0178371 A1 | 6/2015 | Seth et al. |
| 2015/0195406 A1 | 7/2015 | Dwyer et al. |
| 2015/0213454 A1 | 7/2015 | Vedula |
| 2015/0215464 A1 | 7/2015 | Shaffer et al. |
| 2015/0222751 A1 | 8/2015 | Odinak et al. |
| 2015/0256677 A1 | 9/2015 | Konig et al. |
| 2015/0262188 A1 | 9/2015 | Franco |
| 2015/0262208 A1 | 9/2015 | Bjontegard et al. |
| 2015/0269377 A1 | 9/2015 | Gaddipati |
| 2015/0271334 A1 | 9/2015 | Wawrzynowicz |
| 2015/0281445 A1 | 10/2015 | Kumar et al. |
| 2015/0281449 A1 | 10/2015 | Milstein et al. |
| 2015/0281450 A1 | 10/2015 | Shapiro et al. |
| 2015/0281454 A1 | 10/2015 | Milstein et al. |
| 2015/0287410 A1 | 10/2015 | Mengibar et al. |
| 2015/0295788 A1 | 10/2015 | Witzman et al. |
| 2015/0296081 A1 | 10/2015 | Jeong |
| 2015/0334230 A1 | 11/2015 | Volzke |
| 2015/0339446 A1 | 11/2015 | Sperling et al. |
| 2015/0339620 A1 | 11/2015 | Esposito et al. |
| 2015/0339769 A1 | 11/2015 | Deoliveira et al. |
| 2015/0347900 A1 | 12/2015 | Bell et al. |
| 2015/0350429 A1 | 12/2015 | Kumar et al. |
| 2015/0350440 A1 | 12/2015 | Steiner et al. |
| 2015/0350442 A1* | 12/2015 | O'Connor ........... H04M 3/5232 379/265.11 |
| 2015/0350443 A1 | 12/2015 | Kumar et al. |
| 2015/0379562 A1 | 12/2015 | Spievak et al. |
| 2016/0026629 A1 | 1/2016 | Clifford et al. |
| 2016/0034260 A1 | 2/2016 | Ristock et al. |
| 2016/0034995 A1 | 2/2016 | Williams et al. |
| 2016/0036981 A1 | 2/2016 | Hollenberg et al. |
| 2016/0036983 A1 | 2/2016 | Korolev et al. |
| 2016/0042419 A1 | 2/2016 | Singh |
| 2016/0042749 A1 | 2/2016 | Hirose |
| 2016/0055499 A1 | 2/2016 | Hawkins et al. |
| 2016/0057284 A1 | 2/2016 | Nagpal et al. |
| 2016/0065739 A1 | 3/2016 | Brimshan et al. |
| 2016/0080567 A1 | 3/2016 | Hooshiari et al. |
| 2016/0085891 A1 | 3/2016 | Ter et al. |
| 2016/0112867 A1 | 4/2016 | Martinez |
| 2016/0124937 A1 | 5/2016 | Elhaddad |
| 2016/0125456 A1 | 5/2016 | Wu et al. |
| 2016/0134624 A1 | 5/2016 | Jacobson et al. |
| 2016/0140627 A1 | 5/2016 | Moreau et al. |
| 2016/0150086 A1 | 5/2016 | Pickford |
| 2016/0155080 A1 | 6/2016 | Gnanasambandam et al. |
| 2016/0173692 A1 | 6/2016 | Wicaksono et al. |
| 2016/0180381 A1 | 6/2016 | Kaiser et al. |
| 2016/0191699 A1 | 6/2016 | Agrawal et al. |
| 2016/0191709 A1 | 6/2016 | Pullamplavil et al. |
| 2016/0191712 A1 | 6/2016 | Bouzid et al. |
| 2016/0234386 A1 | 8/2016 | Wawrzynowicz |
| 2016/0247165 A1 | 8/2016 | Ryabchun et al. |
| 2016/0261747 A1 | 8/2016 | Thirugnanasundaram et al. |
| 2016/0295018 A1 | 10/2016 | Loftus et al. |
| 2016/0300573 A1 | 10/2016 | Carbune et al. |
| 2016/0335576 A1 | 11/2016 | Peng |
| 2016/0349960 A1 | 12/2016 | Kumar et al. |
| 2016/0358611 A1 | 12/2016 | Abel |
| 2016/0360033 A1 | 12/2016 | Kocan |
| 2016/0378569 A1 | 12/2016 | Ristock et al. |
| 2016/0381222 A1 | 12/2016 | Ristock et al. |
| 2017/0004178 A1 | 1/2017 | Ponting et al. |
| 2017/0006135 A1 | 1/2017 | Siebel et al. |
| 2017/0006161 A9 | 1/2017 | Riahi et al. |
| 2017/0011311 A1 | 1/2017 | Backer et al. |
| 2017/0024762 A1 | 1/2017 | Swaminathan |
| 2017/0032436 A1 | 2/2017 | Disalvo et al. |
| 2017/0034226 A1 | 2/2017 | Bostick et al. |
| 2017/0068436 A1 | 3/2017 | Auer et al. |
| 2017/0068854 A1 | 3/2017 | Markiewicz et al. |
| 2017/0098197 A1 | 4/2017 | Yu et al. |
| 2017/0104875 A1 | 4/2017 | Im et al. |
| 2017/0111505 A1 | 4/2017 | Mcgann et al. |
| 2017/0111509 A1 | 4/2017 | McGann et al. |
| 2017/0116173 A1 | 4/2017 | Lev-Tov et al. |
| 2017/0118336 A1 | 4/2017 | Tapuhi et al. |
| 2017/0132536 A1 | 5/2017 | Goldstein et al. |
| 2017/0148073 A1 | 5/2017 | Nomula et al. |
| 2017/0155766 A1 | 6/2017 | Kumar et al. |
| 2017/0161439 A1 | 6/2017 | Raduchel et al. |
| 2017/0162197 A1 | 6/2017 | Cohen |
| 2017/0169325 A1 | 6/2017 | McCord et al. |
| 2017/0207916 A1 | 7/2017 | Luce et al. |
| 2017/0214795 A1 | 7/2017 | Charlson |
| 2017/0220966 A1 | 8/2017 | Wang |
| 2017/0223070 A1 | 8/2017 | Lin |
| 2017/0236512 A1 | 8/2017 | Williams et al. |
| 2017/0286774 A1 | 10/2017 | Gaidon |
| 2017/0288866 A1 | 10/2017 | Vanek et al. |
| 2017/0308794 A1 | 10/2017 | Fischerstrom |
| 2017/0316386 A1 | 11/2017 | Joshi et al. |
| 2017/0323344 A1 | 11/2017 | Nigul |
| 2017/0337578 A1 | 11/2017 | Chittilappilly et al. |
| 2017/0344754 A1 | 11/2017 | Kumar et al. |
| 2017/0344988 A1 | 11/2017 | Cusden et al. |
| 2017/0359421 A1 | 12/2017 | Stoops et al. |
| 2017/0372436 A1 | 12/2017 | Dalal et al. |
| 2018/0018705 A1 | 1/2018 | Tognetti |
| 2018/0032997 A1 | 2/2018 | Gordon et al. |
| 2018/0052664 A1 | 2/2018 | Zhang et al. |
| 2018/0053401 A1 | 2/2018 | Martin et al. |

(56) References Cited

U.S. PATENT DOCUMENTS

| | | |
|---|---|---|
| 2018/0054464 A1 | 2/2018 | Zhang et al. |
| 2018/0060830 A1 | 3/2018 | Abramovici et al. |
| 2018/0061256 A1 | 3/2018 | Elchik et al. |
| 2018/0077088 A1 | 3/2018 | Cabrera-Cordon et al. |
| 2018/0077250 A1 | 3/2018 | Prasad et al. |
| 2018/0097910 A1 | 4/2018 | D'Agostino et al. |
| 2018/0114234 A1 | 4/2018 | Fighel |
| 2018/0121766 A1 | 5/2018 | Mccord et al. |
| 2018/0137472 A1 | 5/2018 | Gorzela et al. |
| 2018/0137555 A1 | 5/2018 | Clausse et al. |
| 2018/0146093 A1 | 5/2018 | Kumar et al. |
| 2018/0150749 A1 | 5/2018 | Wu et al. |
| 2018/0152558 A1 | 5/2018 | Chan et al. |
| 2018/0165062 A1 | 6/2018 | Yoo et al. |
| 2018/0165691 A1 | 6/2018 | Heater et al. |
| 2018/0165692 A1 | 6/2018 | McCoy |
| 2018/0165723 A1 | 6/2018 | Wright et al. |
| 2018/0174198 A1 | 6/2018 | Wilkinson et al. |
| 2018/0189273 A1 | 7/2018 | Campos et al. |
| 2018/0190144 A1 | 7/2018 | Corelli et al. |
| 2018/0198917 A1 | 7/2018 | Ristock et al. |
| 2018/0205825 A1 | 7/2018 | Vymenets et al. |
| 2018/0248818 A1 | 8/2018 | Zucker et al. |
| 2018/0260857 A1 | 9/2018 | Kar et al. |
| 2018/0285423 A1 | 10/2018 | Ciano et al. |
| 2018/0286000 A1 | 10/2018 | Berry et al. |
| 2018/0293327 A1 | 10/2018 | Miller et al. |
| 2018/0293532 A1 | 10/2018 | Singh et al. |
| 2018/0300295 A1 | 10/2018 | Maksak et al. |
| 2018/0300641 A1 | 10/2018 | Donn et al. |
| 2018/0308072 A1 | 10/2018 | Smith et al. |
| 2018/0309801 A1 | 10/2018 | Rathod |
| 2018/0349858 A1 | 12/2018 | Walker et al. |
| 2018/0361253 A1 | 12/2018 | Grosso |
| 2018/0365651 A1 | 12/2018 | Sreedhara et al. |
| 2018/0367672 A1 | 12/2018 | Ristock et al. |
| 2018/0372486 A1 | 12/2018 | Farniok et al. |
| 2018/0376002 A1 | 12/2018 | Abraham |
| 2019/0013017 A1 | 1/2019 | Kang et al. |
| 2019/0028587 A1 | 1/2019 | Unitt et al. |
| 2019/0028588 A1 | 1/2019 | Shinseki et al. |
| 2019/0037077 A1 | 1/2019 | Konig et al. |
| 2019/0042988 A1 | 2/2019 | Brown et al. |
| 2019/0043106 A1 | 2/2019 | Talmor et al. |
| 2019/0058793 A1 | 2/2019 | Konig et al. |
| 2019/0104092 A1 | 4/2019 | Koohmarey et al. |
| 2019/0108834 A1 | 4/2019 | Nelson et al. |
| 2019/0130329 A1 | 5/2019 | Fama et al. |
| 2019/0132443 A1 | 5/2019 | Munns et al. |
| 2019/0146647 A1 | 5/2019 | Ramachandran et al. |
| 2019/0147045 A1 | 5/2019 | Kim |
| 2019/0172291 A1 | 6/2019 | Naseath |
| 2019/0180095 A1 | 6/2019 | Ferguson et al. |
| 2019/0180747 A1 | 6/2019 | Back et al. |
| 2019/0182383 A1 | 6/2019 | Shaev et al. |
| 2019/0196676 A1 | 6/2019 | Hillis et al. |
| 2019/0197568 A1 | 6/2019 | Li et al. |
| 2019/0205389 A1 | 7/2019 | Tripathi et al. |
| 2019/0236205 A1 | 8/2019 | Jia et al. |
| 2019/0238680 A1 | 8/2019 | Narayanan et al. |
| 2019/0253553 A1 | 8/2019 | Chishti |
| 2019/0258825 A1 | 8/2019 | Krishnamurthy |
| 2019/0287517 A1 | 9/2019 | Green et al. |
| 2019/0295027 A1 | 9/2019 | Dunne et al. |
| 2019/0306315 A1 | 10/2019 | Portman et al. |
| 2019/0335038 A1 | 10/2019 | Alonso Y Caloca et al. |
| 2019/0341030 A1 | 11/2019 | Hammons et al. |
| 2019/0342450 A1 | 11/2019 | Kulkarni et al. |
| 2019/0349477 A1 | 11/2019 | Kotak |
| 2019/0377789 A1 | 12/2019 | Jegannathan et al. |
| 2019/0378076 A1 | 12/2019 | O'Gorman et al. |
| 2019/0385597 A1 | 12/2019 | Katsamanis et al. |
| 2019/0386917 A1 | 12/2019 | Malin |
| 2019/0392357 A1 | 12/2019 | Surti et al. |
| 2019/0394333 A1 | 12/2019 | Jiron et al. |
| 2020/0005375 A1 | 1/2020 | Sharan et al. |
| 2020/0007680 A1 | 1/2020 | Wozniak |
| 2020/0012697 A1 | 1/2020 | Fan et al. |
| 2020/0012992 A1 | 1/2020 | Chan et al. |
| 2020/0019893 A1 | 1/2020 | Lu |
| 2020/0028968 A1 | 1/2020 | Mendiratta et al. |
| 2020/0050788 A1 | 2/2020 | Feuz et al. |
| 2020/0050996 A1 | 2/2020 | Generes, Jr. et al. |
| 2020/0058299 A1 | 2/2020 | Lee et al. |
| 2020/0076947 A1 | 3/2020 | Deole |
| 2020/0097544 A1 | 3/2020 | Alexander et al. |
| 2020/0104801 A1 | 4/2020 | Kwon et al. |
| 2020/0118215 A1 | 4/2020 | Rao et al. |
| 2020/0119936 A1 | 4/2020 | Balasaygun et al. |
| 2020/0125919 A1 | 4/2020 | Liu et al. |
| 2020/0126126 A1 | 4/2020 | Briancon et al. |
| 2020/0128130 A1* | 4/2020 | Geary .............. H04M 3/5141 |
| 2020/0134492 A1 | 4/2020 | Copeland |
| 2020/0134648 A1 | 4/2020 | Qi et al. |
| 2020/0137097 A1 | 4/2020 | Zimmermann et al. |
| 2020/0154170 A1 | 5/2020 | Wu et al. |
| 2020/0160870 A1 | 5/2020 | Baughman et al. |
| 2020/0175478 A1 | 6/2020 | Lee et al. |
| 2020/0193335 A1 | 6/2020 | Sekhar et al. |
| 2020/0193983 A1 | 6/2020 | Choi |
| 2020/0211120 A1 | 7/2020 | Wang et al. |
| 2020/0218766 A1 | 7/2020 | Yaseen et al. |
| 2020/0219500 A1 | 7/2020 | Bender et al. |
| 2020/0242540 A1 | 7/2020 | Rosati et al. |
| 2020/0250272 A1 | 8/2020 | Kantor et al. |
| 2020/0250557 A1 | 8/2020 | Kishimoto et al. |
| 2020/0257996 A1 | 8/2020 | London |
| 2020/0280578 A1 | 9/2020 | Hearty et al. |
| 2020/0280635 A1 | 9/2020 | Barinov et al. |
| 2020/0285936 A1 | 9/2020 | Sen |
| 2020/0329154 A1 | 10/2020 | Baumann et al. |
| 2020/0336567 A1 | 10/2020 | Dumaine |
| 2020/0342868 A1 | 10/2020 | Lou et al. |
| 2020/0351375 A1 | 11/2020 | Lepore et al. |
| 2020/0351405 A1 | 11/2020 | Pace |
| 2020/0357026 A1 | 11/2020 | Liu et al. |
| 2020/0364507 A1 | 11/2020 | Berry |
| 2020/0365148 A1 | 11/2020 | Ji et al. |
| 2020/0395008 A1 | 12/2020 | Cohen et al. |
| 2020/0410506 A1 | 12/2020 | Jones et al. |
| 2021/0004536 A1 | 1/2021 | Adibi et al. |
| 2021/0005206 A1 | 1/2021 | Adibi et al. |
| 2021/0042839 A1 | 2/2021 | Adamec |
| 2021/0056481 A1 | 2/2021 | Wicaksono et al. |
| 2021/0067627 A1 | 3/2021 | Delker et al. |
| 2021/0081869 A1 | 3/2021 | Zeelig et al. |
| 2021/0081955 A1 | 3/2021 | Zeelig et al. |
| 2021/0082417 A1 | 3/2021 | Zeelig et al. |
| 2021/0082418 A1 | 3/2021 | Zeelig et al. |
| 2021/0084149 A1 | 3/2021 | Zeelig et al. |
| 2021/0089762 A1 | 3/2021 | Rahimi et al. |
| 2021/0091996 A1 | 3/2021 | Mcconnell et al. |
| 2021/0105361 A1 | 4/2021 | Bergher et al. |
| 2021/0124843 A1 | 4/2021 | Vass et al. |
| 2021/0125275 A1 | 4/2021 | Adibi |
| 2021/0133763 A1 | 5/2021 | Adibi et al. |
| 2021/0133765 A1 | 5/2021 | Adibi et al. |
| 2021/0134282 A1 | 5/2021 | Adibi et al. |
| 2021/0134283 A1 | 5/2021 | Adibi et al. |
| 2021/0134284 A1 | 5/2021 | Adibi et al. |
| 2021/0136198 A1* | 5/2021 | Leavitt .............. H04M 3/5191 |
| 2021/0136204 A1 | 5/2021 | Adibi et al. |
| 2021/0136205 A1 | 5/2021 | Adibi et al. |
| 2021/0136206 A1 | 5/2021 | Adibi et al. |
| 2021/0201244 A1 | 7/2021 | Sella et al. |
| 2022/0129905 A1 | 4/2022 | Sethumadhavan et al. |

FOREIGN PATENT DOCUMENTS

| | | |
|---|---|---|
| WO | 2006/037836 A1 | 4/2006 |
| WO | 2012/024316 A2 | 2/2012 |
| WO | 2015/099587 A1 | 7/2015 |
| WO | 2019142743 A1 | 7/2019 |

(56) References Cited

FOREIGN PATENT DOCUMENTS

OTHER PUBLICATIONS

Fan et al., "Demystifying Big Data Analytics for Business Intelligence Through the Lens of Marketing Mix", Big Data Research, vol. 2, Issue 1, Mar. 1, 2015, 16 pages.
An et al., Towards Automatic Persona Generation Using Social Media Aug. 1, 2016, 2016 IEEE 4th International Conference on Future Internet of Things and Cloud Workshops (FiCloudW), 2 pages.
Bean-Mellinger, Barbara., "What Is the Difference Between Marketing and Advertising?", available on Feb. 12, 2019, retrieved from https://smallbusiness.chron .com/difference-between-marketing-advertising-2504 7 .html, Feb. 12, 2019, 6 pages.
Twin, Alexandra., "Marketing", URL: https://www.investopedia.com/lerms/m/marketing.asp, Mar. 29, 2019, 5 pages.
dictionary.com, "Marketing", URL: https://www.dictionary.com/browse/marketing, Apr. 6, 2019, 7 pages.
Ponn et al., "Correlational Analysis between Weather and 311 Service Request Volume", eil.mie.utoronto.ca., Jan. 1, 2017, 16 pages.
Zhang et al., "A Bayesian approach for modeling and analysis of call center arrivals", Jan. 1, 2013 Winter Simulations Conference (WSC), ieeexplore.ieee.org, pp. 713-723.
Mehrotra et al., "Call Center Simulation Modeling: Methods, Challenges, and Opportunities" Proceedings of the 2003 Winter Simulation Conference, vol. 1, Jan. 1, 2003, pp. 135-143.
Mandelbaum et al., "Staffing Many-Server Queues with Impatient Customers: Constraint Satisfaction in Call Center", Operations Research, Sep.-Oct. 2009, vol. 57, No. 5 (Sep. 1-Oct., 2009), pp. 1189-1205.
Fukunaga et al., "Staff Scheduling for Inbound Call Centers and Customer Contact Centers", AI Magazine, Winter, vol. 23, No. 4, Jan. 1, 2002, pp. 30-40.
Feldman et al., "Staffing of Time-Varying Queues to Achieve Time-Stable Performance", Management Science, Feb. 1, 2008, vol. 54, No. 2, Call Center Management, pp. 324-338.
Business Wire, "Rockwell SSD announces Call Center Simulator", Feb. 4, 1997, 4 pages.
Nathan, Stearns., "Using skills-based routing to the advantage of your contact center", Customer Inter@ction Solutions, Technology Marketing Corporation, May 1, 2001, vol. 19 No. 11, pp. 54-56.
Aksin et al., "The Modern Call Center: A Multi-Disciplinary Perspective on Operations Management Research", Production and Operations Management, 2007, vol. 16, No. 6, pp. 665-688.
Aldor-Noiman, et al., "Workload forecasting for a call center: Methodology and a case study." The Annals of Applied Statistics 3.4 (2009); 1403-1447.
Buesing et al., "Getting the Best Customer Service from your IVR: Fresh eyes on an old problem," [online] McKinsey and Co., published on Feb. 1, 2019, available at: < https://www.nnckinsey.conn/business-functions/operations/our-insights/ getting-the-best-customer-service-from-your-ivr-fresh-eyes . . . (Year: 2019).
Chiu et al., "A multi-agent infrastructure for mobile workforce management in a service oriented enterprise", Proceedings of the 38th annual Hawaii international conference on system sciences, IEEE, 2005, pp. 10.
Data Warehousing in the Age of Big Data, Krishnan, 2013, Morgan Kaufmann, Chapter 5.
Diimitrios et al., "An overview of workflow management: From process modeling to workflow automation infrastructure," Distributed and parallel Databases, 1995, vol. 3, No. 2 pp. 119-153.
Ernst et al. "An Annotated Bibliography of Personnel Scheduling and Rostering", CSIRO Mathematical and Information Sciences, 2003, 155 pages.
Ernst et al., "Staff scheduling and rostering: A review of applications, methods and models," European Journal of Operational Research, 2004, vol. 153, pp. 3-27.
Federal Register, vol. 72, No. 195, Oct. 10, 2007, pp. 57526-57535.
Federal Register, vol. 75, No. 169, Sep. 1, 2010, pp. 53643-53660.
Federal register, vol. 79, No. 241 issued on Dec. 16, 2014, p. 74629, col. 2, *Gottschalk* v. *Benson*.
Federal Register, vol. 84, No. 4, Jan. 7, 2019, pp. 50-57.
Federal Register, vol. 84, No. 4, Jan. 7, 2019, p. 53-55.
Grefen et al., "A reference architecture for workflow management systems", Data & Knowledge Engineering, 1998, vol. 27, No. 1, pp. 31-57.
https://www.uspto.gov/patent/laws-and-regulations/examination-policy/examination- guidelines-training-materials-view-ksr, signed Aug. 20, 2010.
Huang et al., "Agent-based workflow management in collaborative product development on the Internet", Computer-Aided Design, 2000, vol. 32, No. 2, pp. 133-144.
Janarthanam, "Hands on Chatbots and conversational UI development: Build chatbots and voice user interfaces with Chatfuel, Dialogflow, Microsoft Bot Framework, Twilio, and Alexa Skills" Dec. 2017.
Koole, et al., "An overview of routing and staffing algorithms in multi-skill customer contact centers." 2006.
Myers et al., "At the Boundary of Workflow and AI", Proc. AAAI 1999 Workshop on Agent-Based Systems in The Business Context, 1999, 09 pages.
Niven, "Can music with prosocial lyrics heal the working world? A field intervention in a call center." Journal of Applied Social Psychology, 2015; 45(3), 132-138. doi:10.1111/jasp.12282 ).
On Hold Marketing, "Growing Your Business with Customized on-Hold Messaging" (Published on Apr. 5, 2018 at https://adhq.com/about/ad-news/growing-your-business-with-customized-on-hold-messaging) (Year: 2018).
U.S. Appl. No. 16/668,214, NFOA dated Nov. 10, 2021.
U.S. Appl. No. 16/668,215, NFOA dated Dec. 7, 2021.
Van Den Bergh et al. "Personnel scheduling: A literature review", European journal of operational research, 2013, vol. 226, No. 3 pp. 367-385.
United States Patent and Trademark Office, Non-Final Office Action for U.S. Appl. No. 16/550,961 dated Mar. 2, 2020.
United States Patent and Trademark Office, Final Office Action for U.S. Appl. No. 16/550,961 dated Jun. 17, 2020.

* cited by examiner

METHOD AND APPARATUS FOR ROUTING COMMUNICATIONS WITHIN A CONTACT CENTER

BACKGROUND

Contact centers, also referred to as "call centers", in which incoming communications are routed to agents, are well known. FIG. 1 is an example system architecture of a cloud-based contact center platform. Customers 110, i.e., parties originating incoming communications to a contact center, interact with the contact center 150 using voice, email, text, web, and other channel, interfaces to communicate with the agents 120 through a network 130 and one or more of text, chat, voice, or multimedia channels, for example. Note that the term "customer", as used herein, refers to a party contacting the contact center for service, information, or the like and includes actual purchasers, potential purchasers, and other parties.

Contact center 150 includes modules for the routing communications from customers 110 to agents 120 for the contact center 150. There modules are referred to herein as the contact routing system 140. The contact routing system 140 could be any of a contact center as a service (CCaS) system, an automated call distributor (ACD) system, or a case system, for example.

The agents 120 may be remote from the contact center 150 and handle communications also referred to as "conversations" herein) with customers 110 on behalf of an enterprise. The agents 120 may utilize devices, such as but not limited to, work stations, desktop computers, laptops, telephones, a mobile smartphone and/or a tablet. Similarly, customers 110 may communicate using a plurality of devices, including but not limited to, a telephone, a mobile smartphone, a tablet, a laptop, a desktop computer, or other devices. For example, telephone communication may traverse networks such as a public switched telephone networks (PSTN), Voice over Internet Protocol (VoIP) telephony (via the Internet), a Wide Area Network (WAN) or a Large Area Network (LAN). The network types are provided by way of example and are not intended to limit types of networks used for communications.

The agents 120 may be assigned to one or more "queues" representing call categories and/or agent skill levels. The agents 120 assigned to a queue may handle communications that are placed in the queue by the contact routing system 140. For example, there may be queues associated with a language (e.g., English or Chinese), topic (e.g., technical support or billing), or a particular country of origin. When a communication is received by the contact routing system 140, the communication may be placed in a relevant queue, and one of the agents 120 associated with the relevant queue may handle the communication. The communications may be assigned to an agent ("push communications") or selected by the agent out of the queue ("pull communications").

The agents 120 may be further organized into one or more teams. The agents 120 may be organized into teams based on a variety of factors including, but not limited to, skills, location, experience, assigned queues, associated or assigned customers 110, and shift. Other factors may be used to assign agents 120 to teams.

A queue can have a routing method/rule associated therewith by which the contact routing system 140 routs communications in that queue to specific agents. Known routing methods include standard, predictive routing, and bullseye routing. Standard routing sends interactions to agents based on the queue. "Bullseye" routing also sends interactions to agents according to the queue, but also includes expansion parameters that adjust the routing target pool over time. Predictive routing applies machine learning to analyze historical contact center data and predict the best matchup between available agents and incoming communications based on the historical contact center data. However, in all of these routing techniques there are instances where specific agents are often overburdened while other agents are not fully utilized.

SUMMARY OF THE INVENTION

The disclosed implementations route communications based on the ability of agents to handle to specific types of communications at the specific time of the communication by quantifying agent capacity and how incoming communications will affect that capacity. A first aspect is a method for routing communications within a contact center computing system, the method comprising: receiving a designated communication, the communication having an associated weighting value; placing the communication into at least one queue, the at least one queue corresponding to agent skills; receiving a current occupancy score for each of multiple agents in the queue, wherein the current occupancy score for each agent is based on weighting values of communications being handled by the agent; receiving a maximum capacity score for each of the multiple agents in the queue, wherein the maximum capacity score for each agent is based on the ability of that agent to handle communications through various channels; and routing the designated communication to a selected agent of the multiple agents, wherein the selected agent is an agent of the multiple agents who has a current occupancy score that is lower than a maximum capacity score for that agent.

A second aspect of the disclosed implementations is a computing system for routing communications within a contact center computing system, the system comprising: at least one computer hardware processor; and at least one memory device having code stored thereon which, when executed by the at least one computer hardware processor, cause the at least one computer hardware processor to carry out the steps of: receiving a designated communication, the communication having an associated weighting value; placing the communication into at least one queue, the at least one queue corresponding to agent skills; receiving a current occupancy score for each of multiple agents in the queue, wherein the current occupancy score for each agent is based on weighting values of communications being handled by the agent; receiving a maximum capacity score for each of the multiple agents in the queue, wherein the maximum capacity score for each agent is based on the ability of that agent to handle communications through various channels; and routing the designated communication to a selected agent of the multiple agents, wherein the selected agent is an agent of the multiple agents who has a current occupancy score that is lower than a maximum capacity score for that agent.

BRIEF DESCRIPTION OF THE DRAWINGS

The foregoing summary, as well as the following detailed description of the invention, will be better understood when read in conjunction with the appended drawings. For the purpose of illustrating the invention, there are shown in the appended drawings various illustrative embodiments. It should be understood, however, that the invention is not limited to the precise arrangements and instrumentalities shown. In the drawings.

DETAILED DESCRIPTION

It is known to consider agent utilization when routing communications. For example, some known implementations indicate the maximum number of concurrent interactions that a contact can assign to an agent. Interactions include voice (calls), chats, emails, messages, and callbacks. for example, it could be deemed that an agent can handle at one time: 1 call, Up to 4 chats, 1 email, 1 message, and 1 callback. An administrator can specify the maximum number of interactions that agents handle simultaneously for each interaction type. Administrators can also designate the interaction types that can interrupt, or alert, agents who handle other interaction types. For example, if an agent is working on an email, then the agent can be prompted to answer an incoming call.

However, such system will continue to route communications to an agent until the agent has reached the maximum number of each type of communication. Accordingly, such systems still result in excessive wait times for certain communications. For example, if an agent has less than a maximum number of chats, emails, messages and callbacks, the agent will still be routed calls even though another agent may have greater capacity. In other words, conventional systems are directed merely to limiting each agent to a maximum predetermined capacity of communications at any specific time but do not address even distribution of communications amongst agents.

Figure 2:
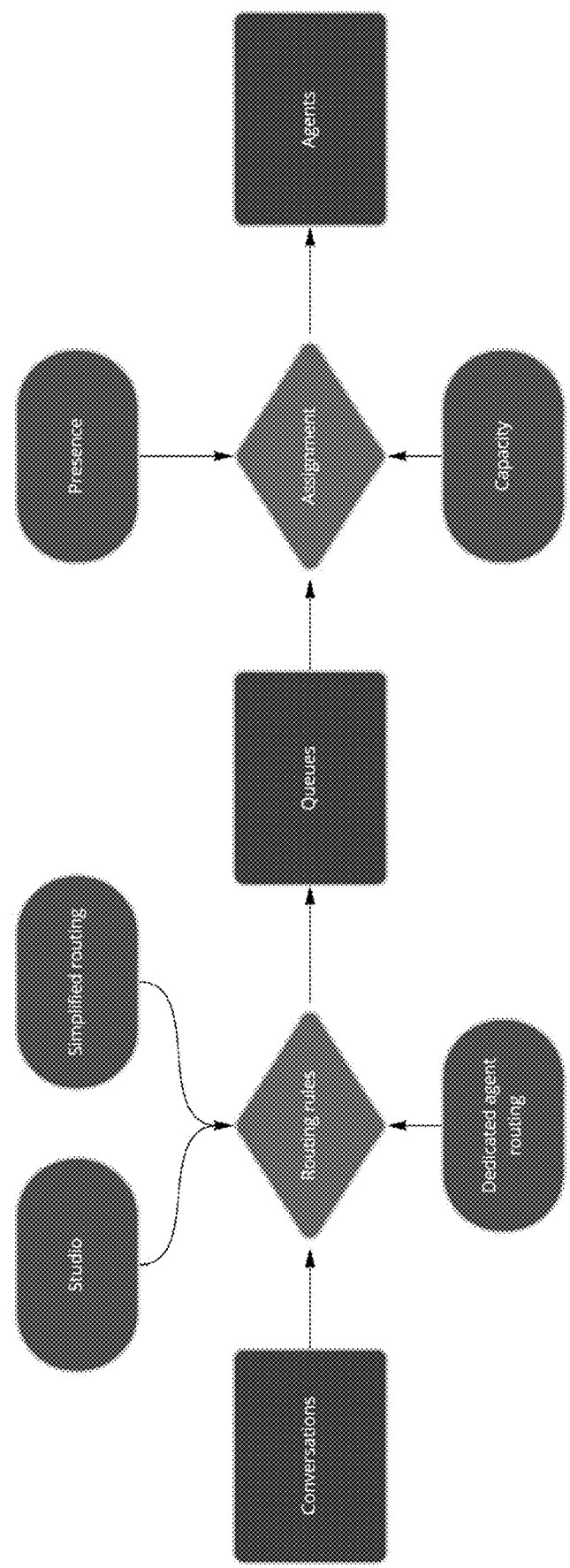
FIG. 2 is a flow diagram of call routing to queues and call assignment to agents based on capacity.

Disclosed implementations provide a method and apparatus for quantifying the total concurrent capacity of each agent and for assigning communications to an agent that has the most available capacity at the time of routing of a communication. Accordingly, agents can be utilized based on their total and available capacity. As shown in FIG. 2, routing rules are applied to assign communications to queues. This assignment can be accomplished in a conventional manner. The queues can correspond to a specific customer need such as the language spoken by the customer, or the content of the customer need. Once assigned to a queue, communications can be routed to agents in that queue based on agent presence and capacity. Disclosed implementations quantify agent capacity and "occupancy" to allow routing of communications in a manner which enhances the efficiency of handling the communications in the call center.

The routing system can address both agent capacity and agent occupancy. "Occupancy" is the portion, such as percentage, of an agent's capacity that is currently being utilized. An agent's status (e.g., available or not available) can be based on occupancy. Again, "capacity" refers to the maximum permitted workload of an agent. The table below is an example of agent total capacity in accordance with the weighting values above. In this example, a maximum capacity value for each agent can be defined as a constant, for example 100. Then a weight value is associated with each communication channel. For example, a voice communication can have a weight value of 51, a chat communication can have a weight value of 10, an SMS communication can have a weight value of 4, and an email communication can have a weight of 4. This allows determination of how many of each communication a specific agent, or group of agents, can handle at one time as well as the relative occupancy of each agent. Agents can be assigned communications as long as the assignment will not increase and agent occupancy score to a value above that agent's maximum capacity score.

| Total Capacity | 100 | Maximum |
| Voice Capacity | 51 | 1 voice call |
| Chat Capacity | 30 | 3 chats |
| SMS Capacity | 5 | 20 SMSs |
| Email Capacity | 5 | 20 emails |

Note that the voice weight value is set as more than half of the total capacity (51 out of 100 in this example) so that an agent will never be assigned two synchronous voice communications at the same time. In this example, an agent could handle, for example, any of the workloads below.

1. 3 chats, 1 email, and 1 SMS=30+4+4=38
2. 2 chats, 8 emails=8+32=40
3. 2 chats, 8 SMSs=20+32=52
4. 1 voice call, 1 chat, 2 emails and 1 SMS=51+10+8+4=73
5. 1 voice call and 9 emails=51+36=87
6. 1 voice call and 9 SMSs=51+36=87
7. 1 voice call, 5 emails and 4 SMSs=51+20+16=87

Note that each workload example above results in a occupancy score that is less than the maximum capacity score (100 in this example). Further, assuming that each workload above corresponds to the workload of a respective agent in the same queue, a communication in that queue can be directed to the agent with workload 1 because the occupancy score of agent 1 is the lowest, i.e. agent 1 has the greatest capacity at the relevant time. It can be seen that such a capacity mechanism is much more efficient than known mechanisms that merely enforce a capacity of each communication channel of an agent. For example, assuming that the agent with workload 2 above had a fixed maximum of 8 emails, 2 chats and one voice call, under the conventional capacity mechanism, if an email communication came into the queue, it would not be assigned to the agent event though the agent has significant remaining capacity (60 out of 100 in this example).

An administrator can define the exact weight for each channel. Other rules can also be implemented. For example, chat ringing can be prohibited while an agent is on a voice communication (even if the agent has enough capacity to receive chat) because it might be too disturbing for the agent that is on an ongoing voice call. As another example, a maximum number of conversations per channel might also be set in some use cases.

In other implementations, there can be the possibility of defining the total capacity per team or queue. Some teams might have higher experience, and therefore they can handle more concurrent work. With the ability to set different capacity per teams/queues, the admin can control the workload that comes to each group of agents with great precision.

Administrators will be able to set a default agent capacity per account and also define the weight for each activity. A calculator/simulator can provide the agent communication capacities. For example, "with these settings agent A will be able to receive 1 voice and X chats at the same time". Preferably, voice communications are the only activity that, in and of itself, renders an agent unavailable, and thus voice communications should each represent more than 50% of the agent capacity so that the communication routing/assignment system doesn't assign 2 concurrent voice communications to the same agent. SMS and Email can be assigned and/or pulled by each agent in a conventional manner. Agents will be able to more efficiently receive more than one chat and, if the administrator defines as such, receive voice communications at the same time as SMS, Email and other communications.

For illustrative purposes, some examples of agent capacity use cases are set forth below. Table 1 below illustrates an example of communication routing logic when an agent is not fully occupied. In this example: Agent Capacity=100; Voice Comm. score=51; and Chat Comm. score=10). As illustrated in row 1 of table 1, when there is an incoming voice communication it will not be assigned to the agent if the agent is already handling a voice communication (because the resulting occupancy score would be 102, which is greater than the preset maximum capacity 100). However, also as illustrated in row 1 the incoming voice communication can be assigned to the agent if the agent is only handling a single chat communication (because the resulting occupancy score would be 61, which is less than the capacity 100). Note that the agent occupancy can stay the same through all phases of a communication (such as wrap-up) or it can be adjusted by phase. For example, occupancy could be reduced to 49 during a wrap of a voice communication to allow the agent to be assigned another voice communication during the wrap up. As shown in row 3, When an agent is currently handling a voice communication or a chat communication, they can pull or be assigned a chat communication because the result would be an occupancy score that is less than the agent capacity of 100). As show in row 4, the agent ordinarily cannot be assigned of pull a voice communication when already handling a voice communication but can pull or be assigned the voice communication when currently handling only a chat communication.

TABLE 1

|  | Agent is Handling Voice Comm. | Agent is Handling Chat Comm. |
|---|---|---|
| 1. Incoming Voice Comm. | NOT POSSIBLE Occupancy: 51 Post-Occupancy: 102 | POSSIBLE Occupancy: 10 Post-Occupancy: 61 |
| 2. Incoming Chat Comm. | POSSIBLE Occupancy: 51 Post-Occupancy: 61 | POSSIBLE Occupancy: 10 Post-Occupancy: 20 |
| 3. Pull Chat Comm. | POSSIBLE Occupancy: 51 Post-Occupancy: 61 | POSSIBLE Occupancy: 10 Post-Occupancy: 20 |
| 4. Pull Voice Comm. | NOT POSSIBLE Occupancy: 51 Post-Occupancy: 102 | POSSIBLE Occupancy: 10 Post-Occupancy: 51 |

Table 2 illustrates another example of capacity based call routing logic. In this example, an incoming chat is weighted higher than a pull chat because agents have control over when to take pull chats and thus might feel comfortable pulling a chat at times when they are otherwise busy. In this example, agent capacity is 100, a voice communication is 100 and a Chat is 100. A pulled chat however is 10.

TABLE 2

|  | Agent is Handling Voice Comm. | Agent is Handling Chat Comm. |
|---|---|---|
| 1. Incoming Voice Comm. | NOT POSSIBLE Occupancy: 100 Post-Occupancy: 200 | POSSIBLE Occupancy: 100 Post-Occupancy: 200 |
| 2. Incoming Chat Comm. | NOT POSSIBLE Occupancy: 100 Post-Occupancy: 200 | NOT POSSIBLE Occupancy: 100 Post-Occupancy: 200 |
| 3. Pull Chat Comm. | POSSIBLE Occupancy: 51 Post-Occupancy: 61 | NOT POSSIBLE Occupancy: 100 Post-Occupancy: 110 |
| 4. Pull Voice Comm. | NOT POSSIBLE Occupancy: 51 Post-Occupancy: 102 | NOT POSSIBLE Occupancy: 100 Post-Occupancy: 200 |

The capacity calculation above can be applied to scenarios in which agents transfer calls back to a queue or transfer calls directly to other agents. All communications, regardless of how they got to an agent, can have a weighting. If Agent 1 transfers a communication to a specific queue, the occupancy of Agent 1 will decrease based on the capacity score of the communication. If Agent 1 transfers a communication to a specific agent (Agent 2), the occupancy of Agent 1 occupancy will decrease and the occupancy of Agent 2 will increase.

Since, by definition, "pull" communications are taken at the behest of the agent, pulled communications can be weighted to have a different effect on the occupancy of an agent. Under the assumption that only communications pushed to, as opposed to pulled by, an agent affect occupancy, if Agent 1 transfers a pushed communication to a specific queue, the occupancy of Agent 1 occupancy will decrease. However, under this assumption, if Agent 1 transfers a pulled conversation to a specific queue, the occupancy of Agent 1 remains the same. Similar, under this assumption, if Agent 1 transfers a pushed communication to a specific agent (Agent 2), the occupancy of Agent 1 will decrease and the occupancy of Agent 2 will increase. However, if Agent 1 transfers a pulled communication to Agent 2, the occupancy of Agent 1 remains the same while the occupancy of Agent 2 will increase. Alternatively, pulled communications could have a non-zero weighting that is lower than pushed communications.

Figure 3:
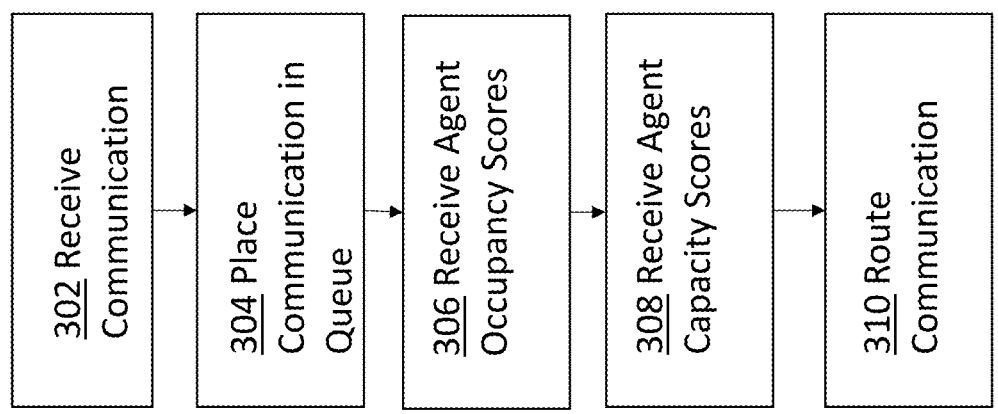
FIG. 3 is a flowchart of a communication routing method in accordance with disclosed implementations.

FIG. 3 illustrates a process for routing a communication in accordance with disclosed implementations. At 302, a designated communication is received y the contact center, the communication having an associated weighting value determined in the manner described herein. At 304, the communication is assigned to at least one queue which corresponds to a requisite set of agent skills. at 306, a current occupancy score for each of multiple agents in the queue is received, wherein the current occupancy score for each agent is based on weighting values of communications being handled by the agent, as described herein. At 308, a maximum capacity score for each of the multiple agents in the queue is received, wherein the maximum capacity score for each agent is based on the ability of that agent to handle communications through various channels. At 310, the communication is routed to a selected agent of the multiple agents. The selected agent is an agent of the multiple agents who has a current occupancy score that is lower than a maximum capacity score for that agent.

Figure 1:
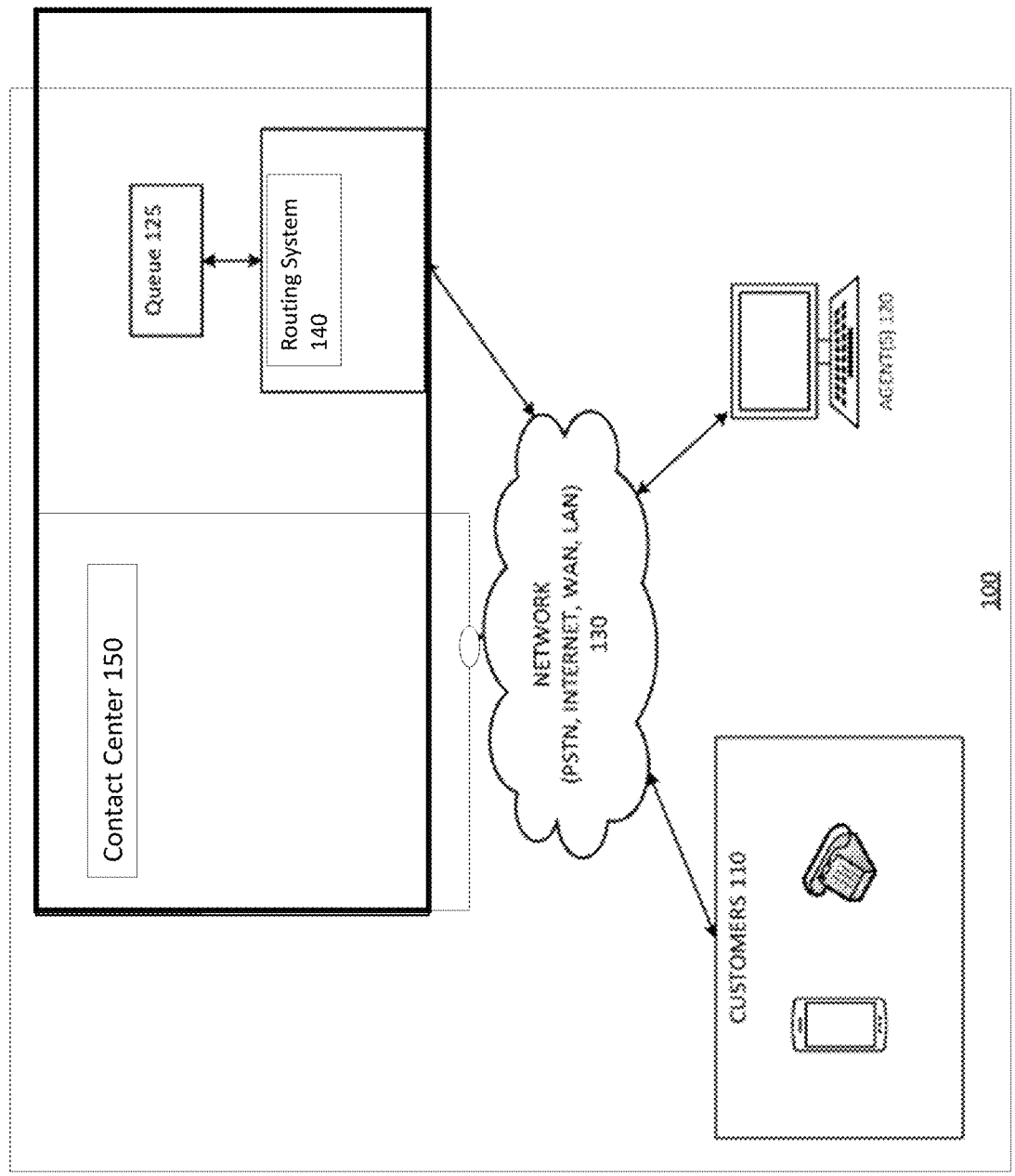
FIG. 1 is a block diagram of a contact center platform.
Figure 4:
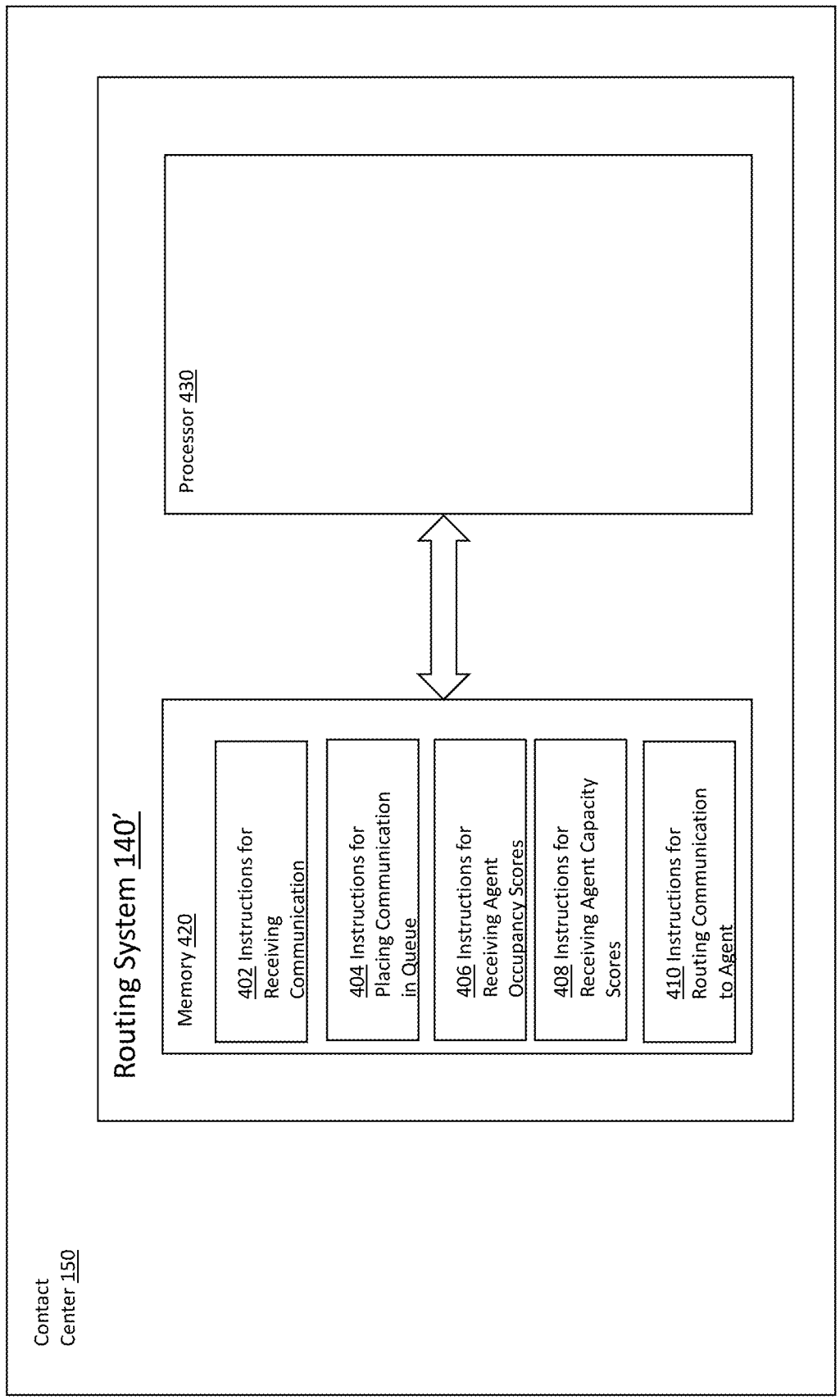
FIG. 4 is a schematic diagram of a computing system for routing communications in accordance with disclosed implementations.

FIG. 4 is a schematic representation of a computing system that embodies routing system 140', which is similar to routing system 140 of FIG. 1, but which operates in accordance with disclosed implementations. Routing system 140' include memory 420 and processor 430. Memory 420 stores code which, when executed by processor 460 can accomplish the method of FIG. 3. Each code portion includes instructions which, when executed by processor 430 comprise a module that accomplishes a step of the method of FIG. 3. The code portions include code portion 402 corresponding to step 302 of FIG. 3, code portion 404 corresponding to step 304 of FIG. 3, code portion 406 corresponding to step 306 of FIG. 3, code portion 4082 corresponding to step 308 of FIG. 3, and code portion 410 corresponding to step 310 of FIG. 3. Routing system 140' is illustrated as being part of contact center 150. However, routing system 140' can be separate form contact center 150 and provide routing of communications for contact center 150 as a service, through a network and appropriate APIs and protocols.

In addition to agent capacity and occupancy, other rules can be applied to manage the assignment of communications to agents. For example, there can be a limit on the total number of communications for each channel that is assigned to a particular agent (such as 5 texts and 3 instant messages. Further, a total capacity per team of agents or per queue can be defined. For example, some teams might have higher experience, and therefore they can handle more concurrent work. This allows workload to be controlled more accurately and thus provides a higher customer service level.

As discussed above, the occupancy and capacity of agents is defined as a score that can be used amongst different communications in different channels or other tasks assigned to an agent. For example, a required training video could have a weighting equal to 100% of the agent maximum capacity to ensure that the agent provides their full attention to the video. Each agent's capacity can be defined based on that agent's skills and experience. For example, expert agents can have higher capacity score than a trainee or temporary/contractor agents.

The occupancy score is shared between all channels according to the weighting values of communications and tasks specific characteristics like the channel, synchronous vs asynchronous communication or tasks, or other factors. It can be seen that a communication is assigned a weighting value to represent the effort and/or level of attention required to handle the communication. The weighting value of a communication can be determined by an Administrator based on the relevance that each factor has on the business logic. The weighting value can vary based on:
  the channel of the communication;
  the queue that the communication was placed in;
  the agent who will be handling the communication;
  the phase of the conversation (e.g., offer phase, conversation phase or wrap-up) the status of the conversation (e.g., if the agent is waiting for a reply from the contact or if the contact is waiting for a reply from the agent);
  conversation direction (e.g., inbound (the customer has reached out to the contact center) or outbound (the agent has started a conversation with the customer); and/or
  offer type (e.g., push (when it interrupts the agent—used in more synchronous communications) or pull (when the conversation is sent to an Inbox and the agent can pull/select the conversation—used in more asynchronous communications).

The disclosed embodiments allow agents to be assigned communications and tasks that have higher weights, but still have capacity for other communications and tasks with lower weights, increasing the productivity and efficiency of the contact center. Further, agents can manually pick (pull) communications with the visibility of the weighting value of the communication and the agent's current occupancy score. Therefore, agents are better able to manage their own workload.

Once an agent's capacity score reaches the maximum, the agent won't receive any pushed communications, which helps the agent to focus on current communications. However, the administrator has the option to allow agents to handle the urgent conversations even if the agent's occupancy score exceeds the capacity. Further, agent occupancy scores can be reported and used to evaluate the agent performance and desired adjustments to the agent capacity and communication weightings.

It is desirable that new communications are assigned to agents based on the capacity of each agent, with communications being assigned to an agent with the highest remaining capacity available, i.e. the lowest occupancy. Supervisors can monitor the average available capacity per agent to determine if some agents' capacity score can be raised, i.e., the agent can handle more conversations simultaneously, or if agents' capacity scores are correct or too high. Artificial intelligence can be used to make suggestions on the best capacity score for each agent. It is further possible to adjust the weighting value of a communication based on the handling time of that conversation compared to the average handling time of this type of conversation.

Figure 5:
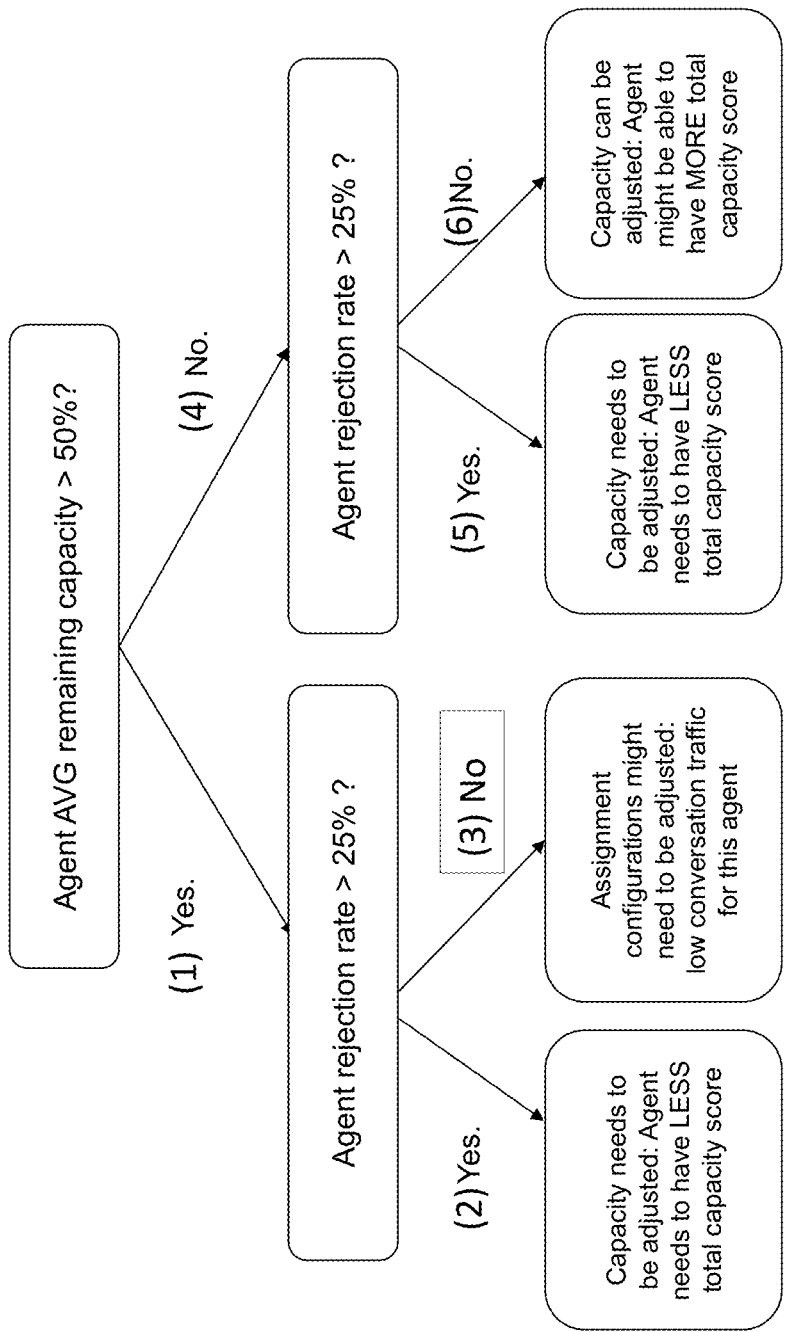
FIG. 5 is a chart showing an example of logic for configuring a computing system for routing communications in accordance with disclosed implementations.

FIG. 5 illustrates a logic flow for making capacity suggestions. As shown in FIG. 5, if an agent's capacity is greater than a threshold (1), 50% in this example, and the agent's rejection rate is greater than a threshold (2), 25% in this example, the capacity of the agent can be adjusted downward. On the other hand, if the agent's capacity is greater than a threshold (1), 50% in this example, and the agent's rejection rate is not greater than a threshold (3), 25% in this example, communicating assignment configurations might need adjustment because the agent is receiving low communication traffic, i.e., the agent is underutilized.

Further, if an agent's capacity is not greater than a threshold (4), 50% in this example, and the agent's rejection rate is greater than a threshold (5), 25% in this example, the capacity of the agent can be adjusted downward. However, if the agent's capacity is not greater than a threshold (4), 50% in this example, and the agent's rejection rate is not greater than a threshold (6), 25% in this example, The agent capacity might be able to be adjusted upward.

Routing can also be accomplished based on capacity per channel. For example, if a new live chat is to be assigned, the live chat communication can be routed to the agent with the highest current capacity for live chats at that time (maximum capacity for live chats—current occupancy or live chats).

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed:
1. A method for increasing the efficiency of connecting communications in a contact center computing system, the method comprising:
  receiving a designated communication, the communication having an associated weighting value;
  placing the communication into at least one queue, the at least one queue corresponding to agent skills;

receiving a current occupancy score for each of multiple agents in the queue, wherein the current occupancy score for each agent is based on weighting values of communications being handled by the agent;

receiving a maximum capacity score for each of the multiple agents in the queue, wherein the maximum capacity score for each agent is based on the ability of that agent to handle communications through various channels; and connecting the designated communication to a selected agent of the multiple agents, wherein the selected agent is an agent of the multiple agents who has a current occupancy score that is lower than a maximum capacity score for that agent, whereby average time between the receiving a communication and the connecting the designated communication to a selected agent is reduced.

2. The method of claim 1, wherein the selected agent is an agent of the multiple agents who has a current capacity score that is lower than a maximum capacity score for that agent by the largest value as compared to other agents of the multiple agents.

3. The method of claim 1, wherein the selected agent is an agent of the multiple agents who has a current capacity score that is lower than a maximum capacity score for that agent by the largest percentage as compared to other agents of the multiple agents.

4. The method of claim 1, wherein the current capacity score of an agent is a total of the weighting value of each communication currently being handled by that agent.

5. The method of claim 1, wherein the weighting value of the designated communication plus the current capacity score of the selected agent is less than or equal to the maximum capacity score of the selected agent.

6. The method of claim 1, wherein the routing step is also based on the maximum capacity score of the multiple agents in the queue in combination.

7. The method of claim 1, wherein the weighting value of a communication, the current capacity score, and the maximum capacity score are scalar values.

8. The method of claim 1, wherein the current capacity score for each agent is based on weighting values of communications having different channels being handled by the agent.

9. The method of claim 8, wherein the capacity score is shared between all channels according to the weighting values of communications of various channels.

10. The method of claim 1, wherein the current capacity score for each agent is also based on the abilities of the agent.

11. The method of claim 1 wherein the weighting value of each communication being handled by the agent is based on at least one of the following:
the channel of the communication;
the queue that the communication was placed in;
a phase of the communication;
a direction of the communication; and/or
an offer type of the communication.

12. A computing system for increasing the efficiency of connecting communications within a contact center, the system comprising:
at least one computer hardware processor; and
at least one memory device having code stored thereon which, when executed by the at least one computer hardware processor, cause the at least one computer hardware processor to carry out the steps of:
receiving a designated communication, the communication having an associated weighting value;
placing the communication into at least one queue, the at least one queue corresponding to agent skills;
receiving a current occupancy score for each of multiple agents in the queue, wherein the current occupancy score for each agent is based on weighting values of communications being handled by the agent;
receiving a maximum capacity score for each of the multiple agents in the queue, wherein the maximum capacity score for each agent is based on the ability of that agent to handle communications through various channels; and
connecting the designated communication to a selected agent of the multiple agents, wherein the selected agent is an agent of the multiple agents who has a current occupancy score that is lower than a maximum capacity score for that agent, whereby average time between the receiving a communication and the connecting the designated communication to a selected agent is reduced.

13. The system of claim 12, wherein the selected agent is an agent of the multiple agents who has a current capacity score that is lower than a maximum capacity score for that agent by the largest value as compared to other agents of the multiple agents.

14. The system of claim 12, wherein the selected agent is an agent of the multiple agents who has a current capacity score that is lower than a maximum capacity score for that agent by the largest percentage as compared to other agents of the multiple agents.

15. The system of claim 12, wherein the current capacity score of an agent is a total of the weighting value of each communication currently being handled by that agent.

16. The system of claim 12, wherein the weighting value of the designated communication plus the current capacity score of the selected agent is less than or equal to the maximum capacity score of the selected agent.

17. The system of claim 12, wherein the routing step is also based on the maximum capacity score of the multiple agents in the queue in combination.

18. The system of claim 12, wherein the weighting value of a communication, the current capacity score, and the maximum capacity score are scalar values.

19. The system of claim 12, wherein the current capacity score for each agent is based on weighting values of communications having different channels being handled by the agent.

20. The system of claim 19, wherein the capacity score is shared between all channels according to the weighting values of communications of various channels.

21. The system of claim 12, wherein the current capacity score for each agent is also based on the abilities of the agent.

22. The system of claim 12 wherein the weighting value of each communication being handled by the agent is based on at least one of the following:
the channel of the communication;
the queue that the communication was placed in;
a phase of the communication;
a direction of the communication; and/or
an offer type of the communication.

\* \* \* \* \*